United States Patent
Kansal et al.

(10) Patent No.: US 8,797,178 B2
(45) Date of Patent: Aug. 5, 2014

(54) EFFICIENT STREAM SHARING FOR MULTI-USER SENSOR DATA COLLECTION

(75) Inventors: Aman Kansal, Issaquah, WA (US); Arsalan Tavakoli-Shiraji, Berkeley, CA (US); Suman Nath, Redmond, WA (US); Feng Zhao, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1158 days.

(21) Appl. No.: 12/045,516

(22) Filed: Mar. 10, 2008

(65) Prior Publication Data

US 2009/0224941 A1    Sep. 10, 2009

(51) Int. Cl.
| | |
|---|---|
| *G08C 19/16* | (2006.01) |
| *G08C 19/22* | (2006.01) |
| *H04Q 9/00* | (2006.01) |
| *G05B 15/02* | (2006.01) |
| *G05B 19/18* | (2006.01) |
| *G05B 13/02* | (2006.01) |
| *G06F 19/00* | (2011.01) |
| *G06F 7/00* | (2006.01) |
| *G06F 17/30* | (2006.01) |

(52) U.S. Cl.
USPC ............... 340/870.07; 340/870.01; 707/713; 707/718; 707/769; 700/9; 700/28; 700/169

(58) Field of Classification Search
CPC .............. G06F 17/30929; G06F 17/30935; G06F 17/30938; G09F 17/30448; G09F 17/30463; H04Q 9/00
USPC ............... 707/769–780, 790–812, 707/999.001–999.005, 713, 718; 709/201–203, 223–226, 250, 252; 700/7, 9, 169, 28, 47, 48; 340/870.01, 340/870.07
See application file for complete search history.

(56) References Cited

U.S. PATENT DOCUMENTS 5,778,364 A * 7/1998 Nelson ................................. 1/1
5,963,253 A   10/1999 Dwyer (Continued)

FOREIGN PATENT DOCUMENTS

| KR | 10-0702852 B1 | 4/2007 |
| WO | WO2005094493 A3 | 10/2005 |
| WO | WO2007-109446 A1 | 9/2007 |

OTHER PUBLICATIONS

Authors: Lukasz Golab, Kumar Gaurav and M. Tamer, Title: Multi-Query Optimization of Sliding Window Aggregates by Schedule Synchronization, pp. 1-22, Date: Aug. 2006.*

(Continued)

*Primary Examiner* — Hai Phan
*Assistant Examiner* — Franklin Balseca
(74) *Attorney, Agent, or Firm* — Dan Choi; Carole Boelitz; Micky Minhas

(57) ABSTRACT

The claimed subject matter provides systems and/or techniques that facilitate and/or effectuate efficient stream sharing for multi-user sensor data collection. The system includes mechanisms that locate within a query a specification that includes spatial regions over which data is required, based on the spatial regions the mechanism determines which sensors are situated within the region or ascertains which of the sensors in the region is actively streaming data and/or has persisted data in order to fulfill the query, constructs or utilizes a directed acyclic graph to obviate redundancy in a functional requirement included in the specification and imposed by the query, and formulates a result in fulfillment of the query that is delivered to an application.

22 Claims, 10 Drawing Sheets

(56) References Cited

U.S. PATENT DOCUMENTS

| | | | |
|---|---|---|---|
| 5,988,847 A * | 11/1999 | McLaughlin et al. | 700/9 |
| 6,687,637 B2 | 2/2004 | Garabedian | |
| 6,910,032 B2 * | 6/2005 | Carlson et al. | 707/769 |
| 7,295,128 B2 | 11/2007 | Petite | |
| 7,693,820 B2 * | 4/2010 | Larson et al. | 707/999.002 |
| 7,710,884 B2 * | 5/2010 | Liu et al. | 370/238 |
| 7,834,875 B2 * | 11/2010 | Liu et al. | 345/440 |
| 7,996,388 B2 * | 8/2011 | Jain et al. | 707/718 |
| 8,055,653 B2 * | 11/2011 | Liu et al. | 707/718 |
| 2005/0063326 A1 | 3/2005 | Ohkuma et al. | |
| 2005/0078672 A1 | 4/2005 | Caliskan et al. | |
| 2006/0271661 A1 * | 11/2006 | Qi et al. | 709/223 |
| 2007/0043803 A1 * | 2/2007 | Whitehouse et al. | 709/201 |
| 2007/0076617 A1 | 4/2007 | Lim et al. | |
| 2007/0198222 A1 | 8/2007 | Schuster et al. | |
| 2007/0208535 A1 | 9/2007 | Misra et al. | |
| 2009/0006346 A1 * | 1/2009 | C N et al. | 707/4 |
| 2009/0106189 A1 * | 4/2009 | Jain et al. | 707/2 |

OTHER PUBLICATIONS

Deborah A. Agarwal. Discussion of reliable multicast deployment progress for the continuous data protocol http://dsd.lbl.gov/~deba/CTBTO/Papers/discussion_of reliable-P.pdf. Last accessed Nov. 15, 2005, 5 pages.

Wagner M. Aioffi, et al. Optimization issues and Algorithms for Wireless Sensor Networks with Mobile Sink. http://www.poms.ucl.ac.be/inoc2007/Papers/author.71/paper/paper.71.pdf. Last accessed Nov. 15, 2005, 6 pages.

Sven Schmidt. Quality-of-Service-Aware Data Stream Processing http://hsss.slub-dresden.de/documents/1174255992231-5474/1174255992231-5474.pdf. Last accessed Nov. 15, 2005, 227 pages.

International Search Report and Written Opinion mailed Aug. 5, 2009 for PCT Application Serial No. PCT/US2009/032779, 12 pages.

Chinese PT Appln. 200980108878.4; 1$^{st}$ Office Action dated Aug. 3, 2012; 10 pages.

Chinese PT Appln. 200980108878.4; 2nd Office Action dated Jan. 15, 2013; 6 pages.

Krishnamurthy, et al., "On-the-Fly Sharing for Streamed Aggregation", Retrieved at <<http://sailesh.googlepages.com/on-the-fly-sharing.pdf>>, SIGMOD 2006, Jun. 27-29, 2006, Chicago, Illinois, USA, 12 pages.

"Notice of Allowance" for CN Application No. 200980108878.4, Mailed Date: Jul. 4, 2013, 9 pages.

* cited by examiner

EFFICIENT STREAM SHARING FOR MULTI-USER SENSOR DATA COLLECTION

BACKGROUND

The Washington Department of Transportation has to date deployed (as have other state transportation departments) a multitude of traffic sensors on highways and roads throughout the state of Washington. These sensors typically measure the volume and average speed of traffic for the covered road segments. Were these traffic sensors to be shared through an access infrastructure that allows any authorized sensing application to access data, multiple applications, such as, traffic characterization, congestion prediction, cab fleet management systems, or urban planning tools could obtain and use data streams from these sensors. In existing systems, each individual application has singularly obtained data directly from sensors and thereafter has performed its computations, quantifications, appraisals, assessments, calibrations, analyses, predictions, and the like, in perfect isolation from other applications that can be performing identical, and/or partially similar, estimations, measurements, triangulations, manipulations, and/or functions.

Consider the following example of sensing tasks that can be provided to and/or supplied by such sensing applications. A commuter consistently gets stuck in traffic on the way home from work. To avoid this daily aggravation the commuter now wishes to determine the average time on a route covering k road segments every 15 minutes in a time window extending from 3 pm to 7 pm, and then wants the minimum over all of these, repeating this determination for each day of the work week. The commuter submits this sensing task to an appropriate sensing application. Unbeknownst to the individual commuter, as well as other sensing applications, there can have been many other sensing tasks submitted by other equally frustrated commuters within the same city where the routes specified contain common road segments and overlapping departure time windows or time horizons.

The subject matter as claimed therefore is directed toward resolving or at the very least mitigating, one or more of the issue elucidated above.

SUMMARY

The following presents a simplified summary in order to provide a basic understanding of some aspects of the disclosed subject matter. This summary is not an extensive overview, and it is not intended to identify key/critical elements or to delineate the scope thereof Its sole purpose is to present some concepts in a simplified form as a prelude to the more detailed description that is presented later.

The claimed subject matter in accordance with an aspect provides systems and methods that effectuate and facilitate efficient stream sharing for multi-sensor data collection. Additionally, the subject matter as claimed in accordance with another aspect provides systems and methods that share data access or computational or functional workloads among multiple applications or data queries. In accordance with yet a further aspect the claimed subject matter provides systems and techniques that infer redundancies based at least in part on spatial coverage required by sensor data applications. And in a further aspect, the subject matter as claimed provides processes and mechanisms that distribute and/or allocate resources according to the nature of critical resources and/or bottleneck spots in usage scenarios.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
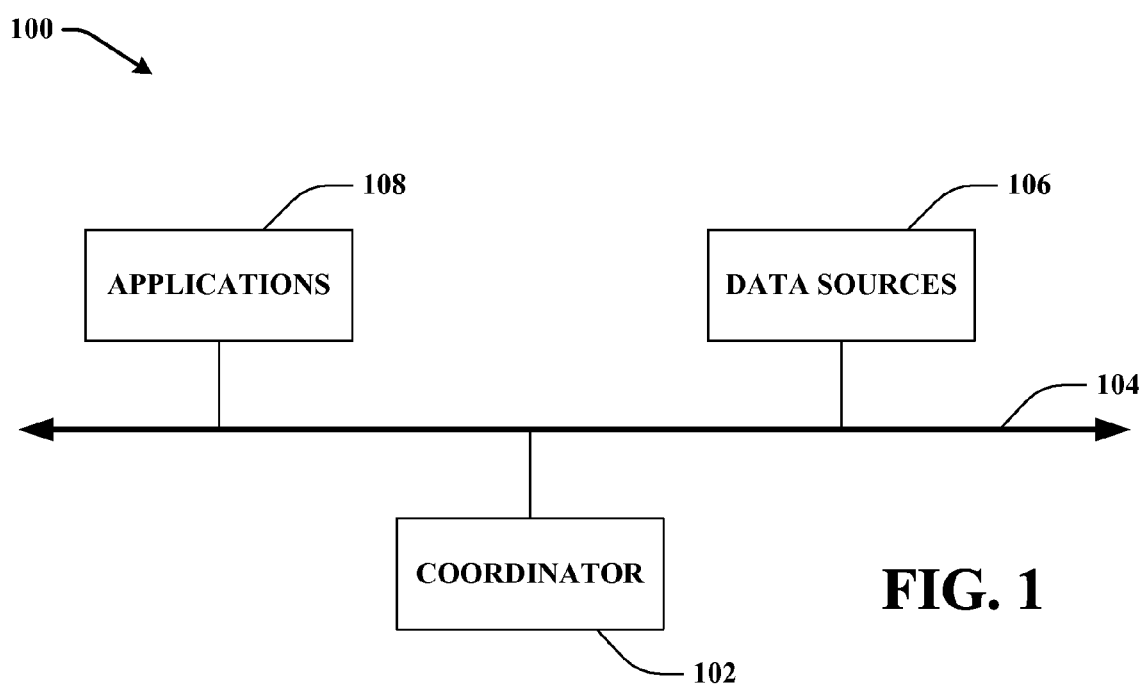
FIG. 1 illustrates a machine-implemented system that effectuates and facilitates efficient stream sharing for multi-sensor data collection in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

It should be noted at the outset that while the claimed subject matter is explicated for the most part in the context of a road traffic congestion sensing application, the subject matter as claimed is not necessarily so limited. As will become apparent and/or will be readily appreciated by those moderately or reasonably cognizant in, or with a passable comprehension of, this field of endeavor, the techniques, methodologies, processes, and/or systems exposited herein can find applicability and/or utility in other contexts and spheres of application, other than the exemplified and elucidated data stream and sensor paradigm, and where similar redundancies are manifest.

The subject matter as claimed in accordance with an illustrative aspect addresses the issue of redundant workloads in systems that rely on sensor data streams. For instance, consider a set of multiple sensors deployed at different locations, for example, road traffic speed sensors deployed at several locations on a highway network. Typically, multiple relevant applications individually query the data streams emanating from the sensors. For instance, one application can compute a minimum time route using the speed data received from the sensors. Multiple applications can be performing different computations on the same data stream for the specific queries to be answered by them. The redundant workload problem here is that the multiple queries that are being computed can have a high degree of similarity. This similarity can arise because the initial steps in the computation can be the same or similar. For example, one application can want to calculate the sum of 10 sensor values whereas another application can want to compute the average (e.g., summation followed by division) of the first five sensor values. In a typical situation extant today, both applications would independently compute the sum of the first five sensors—this computation essentially becomes redundant the first time that the initial application has summed the values from the first five sensors (e.g., the computation need only be performed once). Multiple other factors can lead to such similarities and can result in redundant computations and wastage of resources that can be better employed in other endeavors. The claimed subject matter in accordance with an illustrative aspect therefore aims to prevent redundant computations to save resources.

Further, for many applications that access data from sensors, the sensors or some gateway that connects the sensors to the communication network individually handles all requests for the sensor data. For instance, consider a weather station deployed by a hobbyist at their home and connected to the Internet using the home Internet connection for sharing whether data. If multiple applications access this data from the station approximately simultaneously, the station has to contemporaneously serve multiple data requests causing an excessively heavy load on the home Internet connection and possibly also overloading the home computer or weather station's processor. Accordingly, the claimed subject matter in yet a further illustrative aspect provides systems and/or techniques that reduce, or effectuate and/or facilitate reduction of, redundant computation and bandwidth overheads. The subject matter as claimed can be deployed and applied in multiple ingenious ways and manners to save bandwidth, processing workload, and energy consumption where one or more of these resources are critical. Further, the claimed subject matter can ease load at bottleneck spots to enable support of larger workloads and more applications by determining, generating, and/or utilizing directed acyclic graphs to model various computations and/or sensor usage relationships among multiple applications, and thereafter employing the various resultant graphical models to share as much computation as possible to avoid computational redundancy, for example.

As will be appreciated from the foregoing brief synopsis, there can be many applications that can obtain data from distributed data sources such as sensors or markets and thereafter process the data to produce beneficial, useful, concrete, and tangible results. For instance, applications that compute the fastest driving directions based on traffic conditions and/or obtained road condition data acquired from road sensors, such that these applications compute route travel times resulting in selection of routes that minimize time spent traversing the route. As further example, applications that show temperature distributions over an area can obtain weather data from several weather stations deployed across an area and can compute average, minimum, maximum temperature, humidity, precipitation, Ultra-Violet (UV) radiation indices, and the like. In a further example, a census application can obtain data from several cameras deployed across shopping mall entrances and exits, for instance, and can employ such data to determine the number of people estimated to be within the mall. In yet a further example, geologists and/or agronomists can obtain data from various soil moisture or vibration sensors deployed across the country and based at least in part on such sensor readings can perform scientific analyses and/or computations to study geologic and/or agricultural phenomenon.

In many, if not all, applications using distributed data sources, more than one application can be sharing the same data or data stream and/or performing computations and/or analysis that have some commonality. A first type of commonality that can exist is across applications. For example, multiple applications using road traffic sensors can be performing different computations: a driving directions application may be computing travel times, a city planner may be monitoring congestion points where large backups occur, a marketing billboard replacement agency may be ascertaining road segments with maximum traffic throughput, and so on. However, each of these computations and/or analyses can involve certain basic operations, such as the summation of, or average, over time that are performed as part of many computations. A second kind of commonality can exist among users of the same or similar applications. For example, multiple driving directions computed by the same or similar applications can include processing of data from the same set of sensors, such as when two users request driving directions within the same city and have partially overlapping routes. Both types of commonalities can lead to potentially redundant computation performed by applications.

FIG. 1 illustrates a machine implemented system 100 that effectuates and facilitates efficient stream sharing for multi-user sensor data collection in accordance with an aspect of the claimed subject matter. System 100 can include a coordinator 102 that, via network topology and/or cloud 104, can be in continuous and/or operative or sporadic and/or intermittent communication with data sources 106 such as sensors or privately or publicly held databases that generate or own data. Coordinator 102 also, via network topology and/or cloud 104, can be in continuous and/or operative or sporadic and/or intermittent communication with applications 108 that can request data from data sources 106 and/or aggregate or analyze the acquired data. Moreover, coordinator 102 can be implemented entirely in hardware and/or a combination of hardware and/or software in execution. Further, coordinator 102 can be incorporated within and/or associated with other compatible components. Additionally, coordinator 102 can be any type of machine that includes a processor and/or is capable of effective communication with network topology and/or cloud 104. Illustrative machines that can comprise coordinator 102 can include desktop computers, server class computing devices, cell phones, smart phones, laptop computers, notebook computers, Tablet PCs, consumer and/or industrial devices and/or appliances, hand-held devices, personal digital assistants, multimedia Internet mobile phones, multimedia players, and the like.

Network topology and/or cloud 104 can include any viable communication and/or broadcast technology, for example, wired and/or wireless modalities and/or technologies can be utilized to effectuate the claimed subject matter. Moreover, network topology and/or cloud 104 can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and/or distributed—and/or any combination, permutation, and/or aggregation thereof. Additionally, network topology and/or cloud 104 can include or encompass communications or interchange utilizing Near-Field Communications (NFC) and/or communications utilizing electrical conductance through the human skin, for example.

Data sources 106, in addition to sensors or privately or publicly held databases as stated above, can include other types of sensing devices including, but not limited to, cameras, microphones, weather instruments (e.g., anemometers, barometers, disdrometers, ceilometers, barographs, hygrometers, etc.), geological and/or geographical instruments (e.g., seismometers, strainmeters, and the like), timing devices, automotive instrumentation, avionics, etc. Additionally, data sources 106 can be implemented entirely in hardware and/or as a combination of hardware and/or software in execution. Further, data sources 106 can be, but is not limited to, any type of mechanism, machine, device, facility, and/or instrument that includes a processor and/or is capable of effective and/or operative communications with network topology and/or cloud 104. Mechanisms, machines, devices, facilities, and/or instruments that can comprise data sources 106 can include Tablet PC's, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

Applications 108, like coordinator 102 and data sources 106, can be implemented entirely in hardware and/or as a combination of hardware and/or software in execution. Further, applications 108 can be, but is not limited to, any type of engine, machine, instrument of conversion, or mode of production that includes a processor and/or is capable of effective and/or operative communications with network topology and/or cloud 104. Illustrative instruments of conversion, modes of production, engines, mechanisms, devices, and/or machinery that can comprise and/or embody applications 108 can include desktop computers, server class computing devices and/or databases, cell phones, smart phones, laptop computers, notebook computers, Tablet PCs, consumer and/or industrial devices and/or appliances and/or processes, hand-held devices, personal digital assistants, multimedia Internet enabled mobile phones, multimedia players, and the like.

Figure 2:
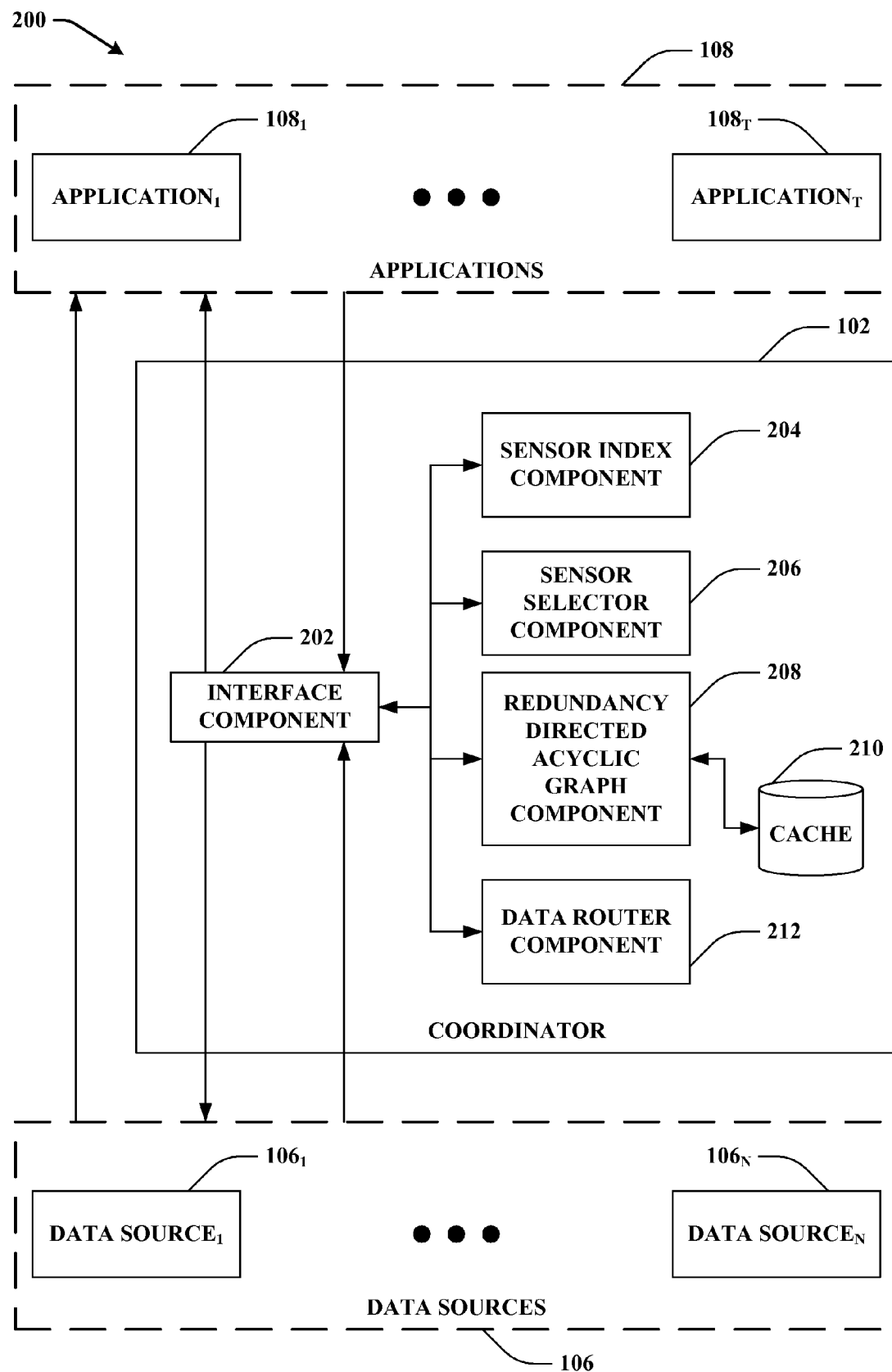
FIG. 2 depicts machine-implemented system that shares data access or computation and/or functional workload among multiple applications or data queries in accordance with an aspect of the claimed subject matter.

FIG. 2 provides depiction 200 of coordinator 102 that facilitates and effectuates efficient stream sharing for multi-user sensor data collection in accordance with an aspect of the claimed subject matter. Coordinator 102 typically can be responsible for determining which data sources 106 are relevant to each application 108 for each set of queries or data needs specified by applications 108. Coordinator 102 can determine the set of relevant data sources 106 based at least in part on an internally persisted index of available data sources 106 as well as the current state of the system with respect to other data sources 106 currently being employed by the system. Coordinator 102 can also determine which computations can be redundant and then can share those computations among applications 108 and/or users. Further, coordinator 102 can, where appropriate, minimize bandwidth and/or processing load on data sources 106 by periodically and/or continuously caching data to local and/or remote persistence means (e.g., volatile memory or non-volatile memory, or both volatile and non-volatile memory).

Coordinator 102 as illustrated can include interface component 202 (hereinafter referred to as "interface 202") that can receive and/or disseminate, communicate, and/or partake in data interchange with a plurality of disparate sources and/or components. For example, interface 202 can receive and transmit data from, and to, a multitude of sources, such as, for instance, data associated with data sources 106, for example, information related to, and emanating from, sensing devices including, but not limited to, cameras, microphones, weather instruments, geological and/or geographical instruments, timing devices, automotive instrumentation, avionics, etc. Additionally and/or alternatively, interface 202 can obtain and/or receive data associated with user names and/or passwords, sets of encryption and/or decryption keys, client applications, services, users, clients, devices, and/or entities involved with a particular transaction, portions of transactions, and thereafter can convey the received or otherwise acquired information to one or more of sensor selector component 204, sensor index component 206, redundancy directed acyclic graph component 208, and data router component 212, for subsequent utilization, processing, and/or analysis. To facilitate its objectives, interface 202 can provide various adapters, connectors, channels, communication pathways, etc. to integrate the various components included in system 200, and more particularly, coordinator 102 into virtually any operating system and/or database system and/or with one another. Additionally and/or alternatively, interface 202 can provide various adapters, connectors, channels, communication modalities, and the like, that can provide for interaction with various components that can comprise system 200, and/or any other component (external and/or internal), data, and the like, associated with system 200.

Applications 108 typically can submit their queries to coordinator 102 (e.g., utilizing web service interfaces, database programming languages, or any other data exchange protocol that can be convenient and that can be utilized for this purpose). A query generally can specify the spatial region and time window (e.g., with a time period) over which data is needed along with a function (e.g., aggregation) that should be, or can be, applied and/or performed on the acquired and/or received data. For example, a query can be posited that requests temperature data for a state (e.g., a region), every 30 minutes (e.g., the time period) over a time window of one week. Further, the query in this illustration can request that the average (e.g., the function) over a 20 mile radius be ascertained. In this example, coordinator 102 can determine which temperature sensors are available within the state, obtain data from the identified sensors, verify which of them are situated within a 20 mile radius of each other and thereafter ascertain the average. Coordinator 102 can thereafter repeat this action every 30 minutes for the specified week as indicated in the received and/or acquired query.

More particularly, coordinator 102 looks at the query specification or parses the query to locate or identify the region over which data is required. The region can be a spatial region defined or circumscribed by a polygon, a geographic boundary, a political boundary, defined as a strip covering a road route, or any other spatial region. Coordinator 102 can employ a sensor index component 204 to determine which sensors are present within a region. Sensor index component 204 solely for purposes of exposition, not limitation, can be implemented as a database that maintains a list of available sensors and allows for efficient methods to search the list for various attributes such as location, for example. The query in accordance with an aspect can specify the list of sensors from which data should be directly acquired. The list of sensors needed to satisfy a query can then be fed to sensor selector component 206 which, for example, in concert with redundancy directed acyclic graph component 208 can identify or ascertain whether data from any of the listed sensors is currently available or is already being streamed. Further, sensor selector component 206 can also determine which additional sensors need to be accessed and/or initialized in order to satisfactorily fulfill the query.

Sensor selector component 206, once it has determined the sensors present within a region and ascertained which additional sensors need to be accessed and/or initialized to fulfill the query, can prune the list of sensors based at least in part on sensor characteristics. For instance, if the two sensors are very close and the accuracy of the results requested in the query is not very high, sensor selector component 206 can decide to obtain data only from one of the sensors. Sensor selector component 206 can also use additional cost-based guidelines or sensor data budgets to select which of the sensors are best suited for use with a particular query, for example. Sensor selector component 206 can thus construct a rationalized list of sensors that can be employed to satisfy the query presented.

Redundancy directed acyclic graph component 208 can receive the rationalized list compiled or assembled by sensor selector component 206 and/or can further parse the query to locate the temporal characteristics required from the data streams associated with the rationalized list of sensors. Additionally, redundancy directed acyclic graph component 208 can also identify within the supplied query specification of the function, if any, that needs to be applied to the incoming data streams to fulfill the query. Redundancy directed acyclic graph component 208 can utilize one or more methods, techniques, or modalities to optimize for redundancy and update its internal data structures to perform the functional requirements set forth in supplied queries in a manner that minimizes or mitigates redundancy.

Based at least in part on the redundancy checks performed by redundancy directed acyclic graph component 208, data streams associated with the rationalized list of sensors can be initiated. As illustrated, data in these streams, from a high level perspective, can flow from data sources 106 to applications 108 via coordinator 102. In order to facilitate this flow from data sources 106 to applications 108, data router component 212 can be employed. Data router component 212 can decide which route is better suited for the flow of data. For instance, when applications 108 are located in proximity to (e.g., close to) data sources 106 and there is no commonality with other applications 108, data can flow directly from the sources (e.g., data sources 106) to the applications 108 rather than going through the coordinator 102. In contrast, when some commonality is determined, or is expected in the near future, coordinator 102 can set data streams to flow through itself so that the data can, for example, be cached in associated cache 210 for subsequent reuse. Further, the chosen route selected by data router component 212 can also depend on network costs, such as bandwidth usage costs or latency costs. Sometimes, data can be streamed directly to applications 108 as well as to coordinator 102, for instance, when applications 108 need low latency and/or coordinator 102 needs to cache the data in associated cache 210. Once coordinator 102 has determined the appropriate redundancies and sharing opportunities, data router component 212 can make the appropriate choices. For instance, data router component 212 can select routes as follows: for a data stream for which some computational or functional redundancies are identified or cache need has been determined, the data can typically be streamed through the coordinator 102. For other flows, until any such need is determined, data can continue to be streamed directly from data sources 106 to applications 108. Of course as will be readily appreciated by those ordinarily skilled in the art, the underlying communication network (e.g., network topology and/or cloud 104), such as the Internet, can also be a determinant in the detailed path between the endpoints chosen by data router component 212.

All or part of the computational or functional requirements specified in the received and/or acquired query can be performed by redundancy directed acyclic graph component 208, for example. Nevertheless, some of the computational or functional workload can also be offloaded from redundancy directed acyclic graph component 208 to the sensors (e.g., data sources 106) themselves, particularly when these sensors (e.g., data sources 106) are capable of accepting and performing such functional and/or computational commitments. Such offloading can be beneficial in certain situations such as when the computations are common to all, or some, application queries and thus the sensors (e.g., data sources 106) can save communication bandwidth by sending processed results rather than raw data. Further, some functionally related computation can be skipped by coordinator 102 altogether and can be performed by applications 108, this can be the case when the computational and/or functional requirements of received and/or acquired queries have no commonality with any other received and/or acquired queries and no redundancies are caused by performing these function or undertaking such computations at the application end (e.g., applications 108). Nevertheless, regardless of how the computational and/or functional tasks are partitioned and/or performed, the results can ultimately be sent to applications 108. Additionally and/or alternatively, the results for computational and/or functional tasks can also be stored by coordinator 102 (e.g., in cache 210) for later reuse or asynchronous access by the applications 108 at later times.

As exposited without limitation herein redundancy directed acyclic graph component 208 typically must determine when redundancies in computation and/or communication exist. Redundancy in communication typically exists when multiple applications 108 need data from the same data sources 106 (e.g., sensors)—in which case data sources 106 should only send out data once. Redundancies in computation can typically exist when two or more queries are performing some common operations on data from the same sensors (e.g., data sources 106). If it is supposed at this juncture that all computations or functional undertakings are performed at the same time step for all queries, then redundancies that exist at common time steps can be referred to as spatial redundancies. Thus, where redundancy directed acyclic graph component 208 can employ directed acyclic graphs to determine spatial redundancies, it does so.

Figure 3:
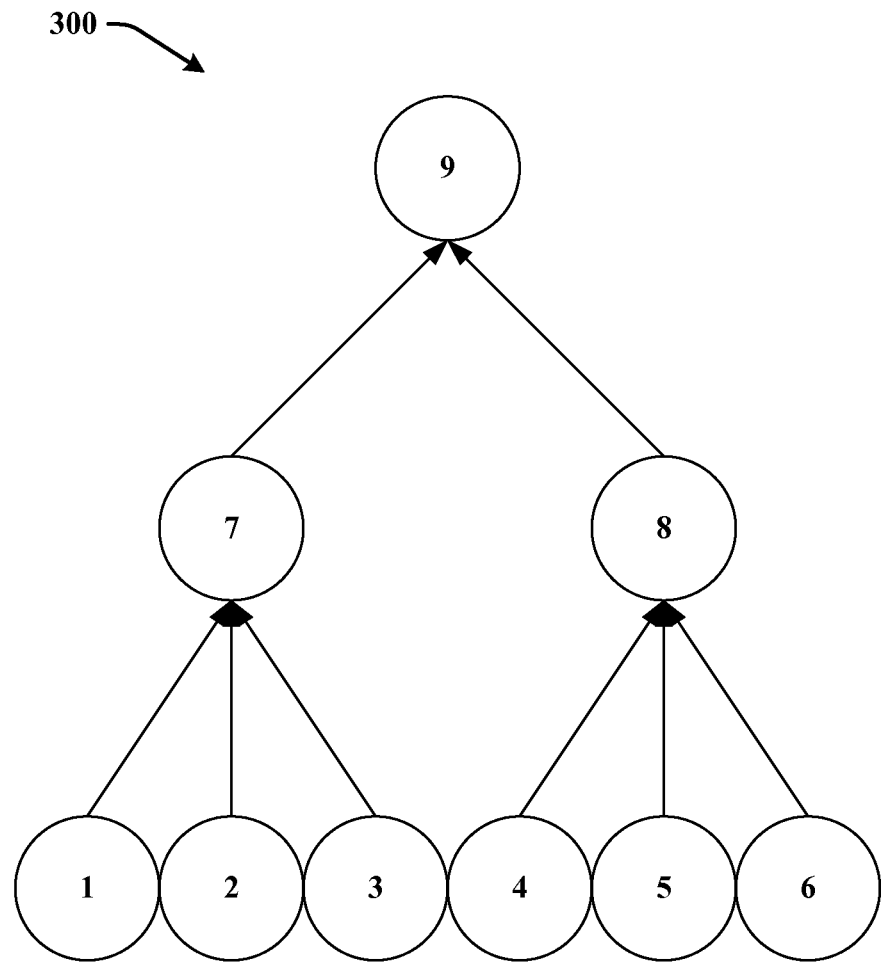
FIG. 3 provides depiction of an illustrative directed acyclic graph that can be utilized in accordance with and by an aspect of the claimed subject matter.

A graph is typically considered to be a structure consisting of nodes that can represent variables and edges between nodes that can represent relationships between the disparate nodes. A directed acyclic graph is generally perceived as being a graph structure with the property that all edges have a direction of connection and no cyclic paths can be found by following the edges in the marked direction. FIG. 3 provides illustration of such a directed acyclic graph 300 with nodes marked 1, 2, 3, 4, 5, 6, 7, 8, 9 where nodes 1, 2, and 3 connect to node 7 via a set of directed edges, nodes 4, 5, and 6 connect to node 8 via another set of directed edges, and nodes 7 and 8 respectively connect to node 9 each via directed edges. Directed acyclic graphs have typically been utilized in modeling many engineering and mathematical tasks. Moreover, it should be noted that it is common notation to refer to nodes that do not have edges coming into them as leaf nodes (e.g., nodes 1, 2, 3, 4, 5, and 6 can be considered leaf nodes). It should be further noted that while leaf nodes typically do not have edges coming into them, leaf nodes can have edges that emanate from them.

Figure 4:
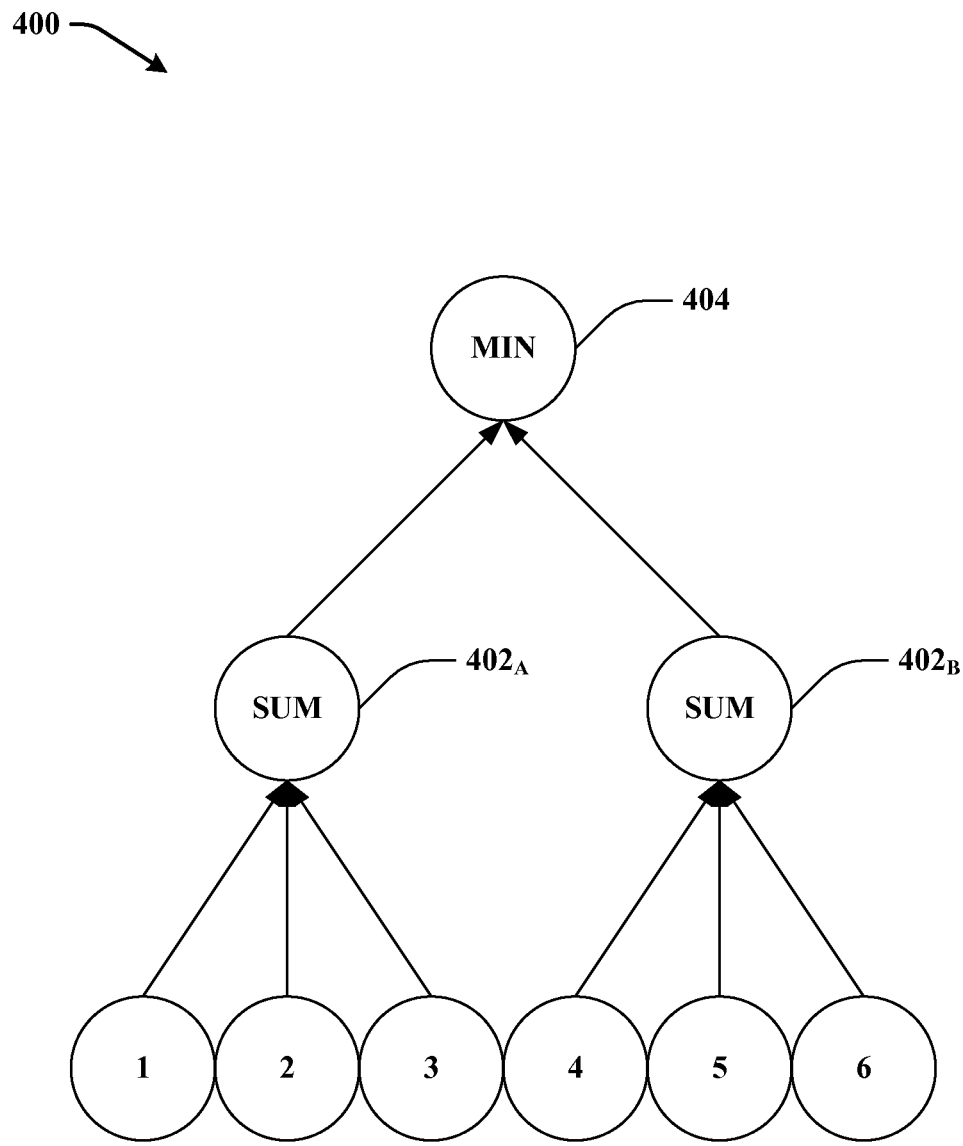
FIG. 4 provides illustration of a directed acyclic graph utilized in the efficient stream sharing of multi-sensor data collections in accordance with an aspect of the claimed subject mater.

Turning back to FIG. 2, and in particular, to the operation of redundancy directed acyclic graph component 208 in accordance with an aspect of the claimed subject matter. Redundancy directed acyclic graph component 208 can, without limitation, utilize a directed acyclic graph in the following manner: leaf nodes (e.g., nodes 1, 2, 3, 4, 5, and 6 in FIG. 3) in this illustration can represent data values from data sources 106 (e.g., one or more sensor input). All other nodes (e.g., higher level nodes 7, 8, and 9 in FIG. 3) can represent some computed data values obtained by imposing some function (e.g., aggregation) on the data values from leaf nodes. FIG. 4 provides illustration of a simple directed acyclic graph 400 where nodes labeled SUM (e.g., $402_A$ and $402_B$) represent values obtained by imposing a summation function on values obtained from leaf nodes 1, 2, 3, 4, 5, and 6. The topmost node denoted as MIN (e.g., 404) can represent values obtained by applying a minimization function on the values obtained from the two intermediary nodes (e.g., $402_A$ and $402_B$). Such a directed acyclic graph as illustrated in FIG. 4 can be utilized to represent queries submitted by applications 108 to coordinator 102.

In a further illustration to minimize redundancy, redundancy directed acyclic graph component 208 can combine directed acyclic graphs representing multiple queries in such a way that common computations or commonality of functions can be identified and performed once. For example, consider two queries Q1 and Q2 submitted to coordinator 102. Directed acyclic graphs 500 representative of these queries is presented in FIG. 5. The leaf node numbers (e.g., 502) represent sensor (e.g., data sources 106) identities that can be accessed. As will be observed, some of the sensors (e.g., data sources 106) are common among the two queries (e.g., nodes 3, 4, and 5). It will also be noted in reference to FIG. 5 that both queries Q1 and Q2 are taking the sum of sensor values from sensors 3, 4, and 5.

Figure 5:
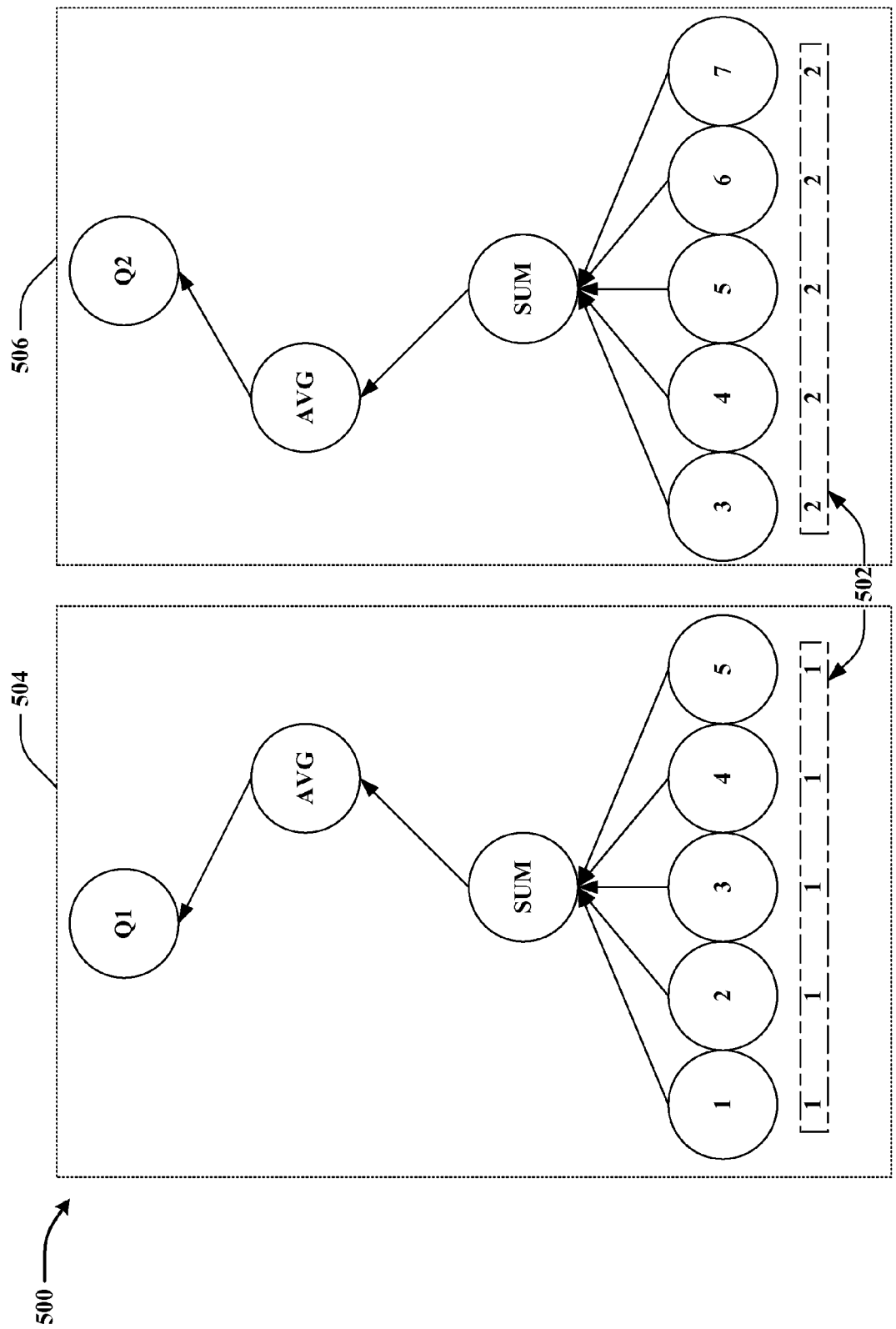
FIG. 5 provides further depiction of a directed acyclic graph employed in the sharing of data access or computational or functional workload among multiple applications or data queries in accordance with an aspect of the claimed subject matter.
Figure 6:
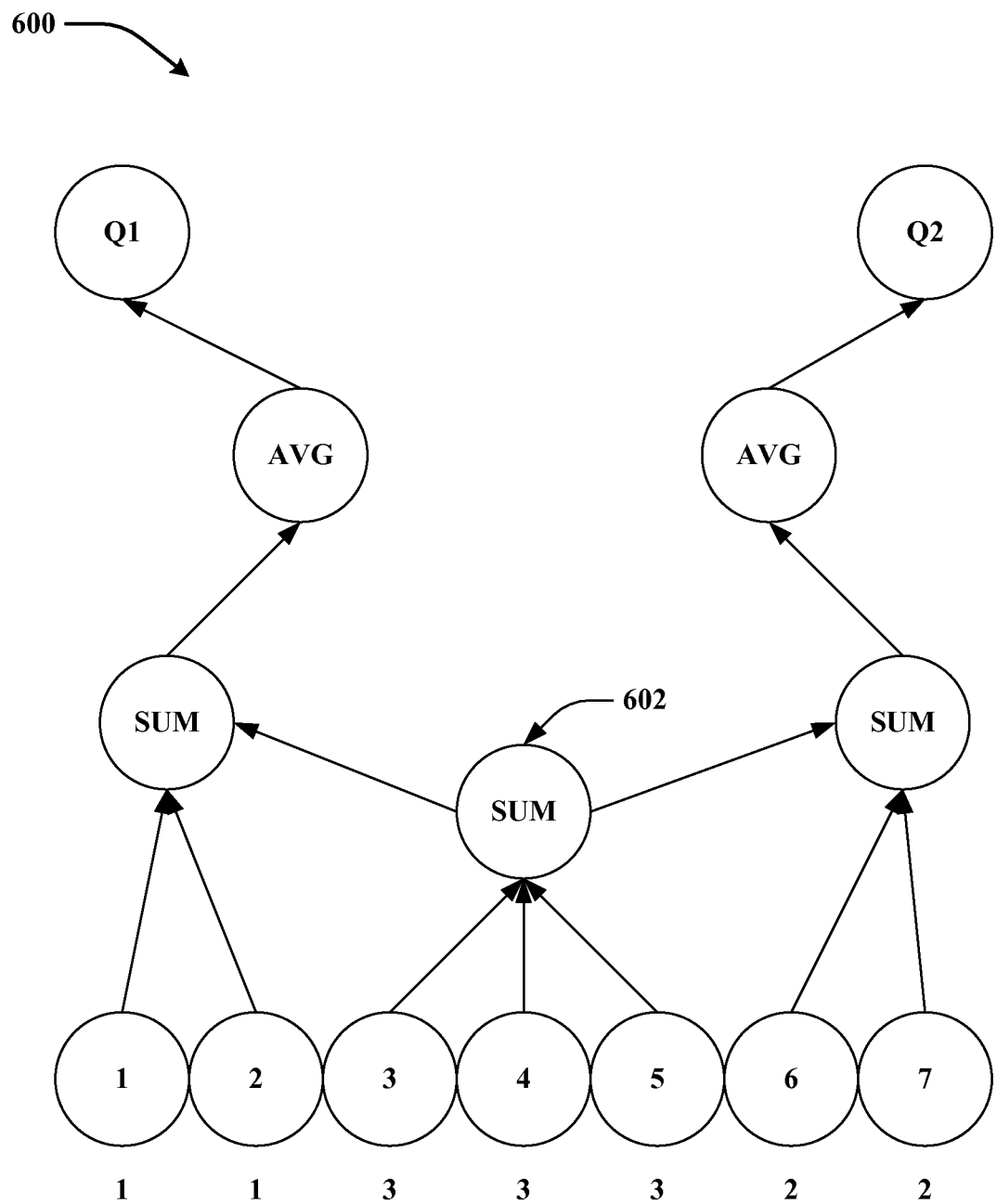
FIG. 6 provides a further depiction of a directed acyclic graph utilized in accordance with an aspect of the subject matter as claimed.

FIG. 6 provides illustration of a combined directed acyclic graph 600 which minimizes the redundancy evident in the directed acyclic graphs 500 depicted in FIG. 5. The combined directed acyclic graph 600 can be achieved in accordance with an aspect of the claimed subject matter by performing the summation (e.g., 602) of the values contained in nodes 3, 4, and 5 (e.g., 3+4+5) once and thereafter re-using it across both queries. As will be readily understood by those moderately conversant in this field of endeavor, when systems are serving large numbers of queries and/or the computations are complex, identifying and minimizing such redundancies can save significant resources.

In order to obtain or derive the redundancy-free combined directed acyclic graph 600 illustrated in FIG. 6 from individual query directed acyclic graphs (e.g., the hierarchical tree structures that depend from query Q1 and query Q2 respectively) the following technique can be utilized by redundancy directed acyclic graph component 208, for example. If it is assumed that all queries received until the current time point have been combined into a directed acyclic graph serving queries q(1) through q(v), where v is an integer greater than or equal to one, and further, for simplicity of illustration, v is set to 1 (e.g., v=1) and the existing query is represented by Q1 as shown by the left directed acyclic graph in FIG. 5 (e.g., 504). When a new query q(v+1) arrives this can be represented as Q2, the right directed acyclic graph in FIG. 5 (e.g., 506). As will be appreciated, the depicted directed acyclic graphs represent but a simple scenario, typically the directed acyclic graphs of all v queries can be very complex and detailed, nevertheless the methodology outlined herein can find equal applicability with respect to such complex directed acyclic graphs.

For each leaf node and/or non-leaf node, redundancy directed acyclic graph component 208 can compute or assign a number (called a signature) and associate the signature (e.g., 502) to each leaf and/or non-leaf node. The signature represents all queries that it serves. For instance, if a node A serves queries 1, 2, and 3, and has signature "x" then all other nodes that also serve queries 1, 2, and 3, will be assigned the same signature "x", other nodes that serve different combinations of queries can be assigned different signature values. For the purposes of this illustration and as exemplified in FIG. 5, if it is assumed that the signature x=1 has been assigned to all nodes in the existing directed acyclic graph for Q1 and signature x=2 has been assigned for all nodes in the directed graph for Q2. The respectively assigned signatures are indicated by 502. It should be noted that for simplicity of illustration, only leaf node signatures 502 have been identified in FIG. 5. The technique to assign unique signatures based on unique sets of query identifiers can include utilizing bitmaps to represent the query numbers, where the length of the bitmaps is equal to the expected number of simultaneous queries, and a "1" in the bit map at location "k" represents the fact that this node serves query "k" while a zero means that this node does not serve query "k". Thereafter, the decimal representation of the binary bitmaps can be employed to compute signatures. For example, the binary bitmaps '01', '10', '11' correspond to the decimal signature values 1, 2, 3 respectively.

Figure 7:
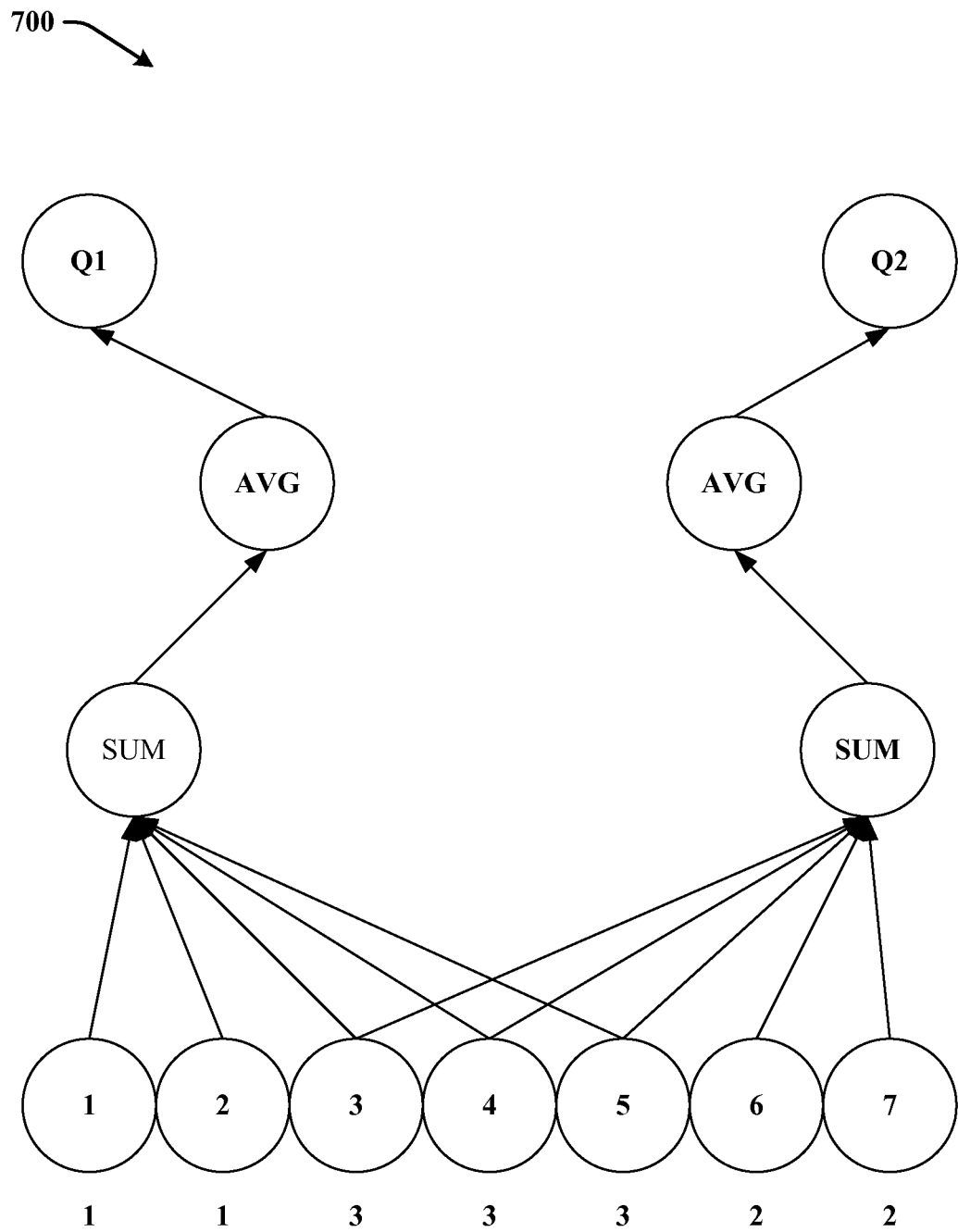
FIG. 7 illustrates yet another directed acyclic graph that can be utilized, generated, and/or produced in accordance with an aspect of the claimed subject matter.

Once redundancy directed acyclic graph component 208 has computed, assigned and/or associated signatures to each leaf and/or non-leaf node, redundancy directed acyclic graphic component 208 can detect leaf nodes that are common among the existing directed acyclic graph (e.g., directed acyclic graph associated with query Q1 (504)) and the new query directed acyclic graph (e.g., directed acyclic graph associated with query Q2 (506)) as well have the same operation being performed (e.g., SUM (602)). Scrutiny of FIG. 5 indicates that nodes 3, 4, and 5 are common and are being aggregated in both query Q1 and query Q2. According to the signature computation algorithm set forth herein, such nodes will be assigned a new signature. For instance, FIGS. 6 and 7 show the new signature x=3 (equivalent to the bitmap '11') for nodes 3, 4, and 5 since they serve a new unique combination of queries: query Q1 and query Q2 (and thus, the $1^{st}$ and the $2^{nd}$ bits of the bitmap signature is set to 1). Nodes that serve only query Q1 continue to have signature 1 (bitmap '01') and those that serve only query Q2 have signature 2 (bitmap '10'). Once signature assignment has been carried out, the directed acyclic graph can look like that illustrated in FIG. 6.

Optimization of the directed cyclic graph (e.g., FIG. 6) can be carried out layer by layer by redundancy directed acyclic component 208, beginning, for example, with the bottom layer of leaf nodes. At each layer, for each set of nodes with the same signature that are connected to more than one node, redundancy directed acyclic component 208 can create a new upper layer node 602 (e.g., referred to as an intermediate node). This intermediate node 602, as illustrated in FIG. 6 can capture the commonality of computation as now the lower layer nodes are connected to only one upper layer node with the implication that no computation is being performed twice. The results computed at the intermediate nodes (e.g., 602) can then be fed to the nodes that were previously fed directly by the lower level nodes. As will be comprehended by those of ordinary skill, this optimization can be repeated at each upper layer to similarly remove redundancies. Once redundancy directed acyclic graph component 208 has computed and removed extant redundancies, query result streams can be set to flow from all upper layer nodes that perform computation of final query results.

In addition to the foregoing, redundancy directed acyclic graph component 208 needs to also reduce redundancies due to similarity in temporal requirements of multiple queries. The temporal characteristics of the queries can result in the following temporal characteristics for redundancy directed acyclic graph nodes. For each leaf node, the node can receive a time period at which data is fetched from data source 106 and a tolerance in this period. For instance, an application 108 may want to update the query results every 15 minutes or faster. Then the time period is 15 minutes and the tolerance is that the time period can be lesser than 15 minutes. This tolerance allows multiple queries with similar time periods to share data streams. For instance, if another query needs data every 10 minutes, both queries can be executed from a single data stream that fetches values every 10 minutes since the first query is satisfied even if sampling is faster than 15 minutes. Thus, it would be redundant to fetch data every 10 minutes and every 15 minutes when fetching every 10 minutes is sufficient.

For each non-leaf node, in addition to the time period and tolerance, there may also be a computation period and a computation window. For instance, a new query can have asked for an average over the last 10 values (e.g., values read every 15 minutes) and the average over the last 10 values is needed every hour. Here, the time period is 15 minutes, the computation period one hour, and the computation window is that of 10 values (e.g., 10 values*15 minutes/value–a computation window of 150 minutes). Redundancies can occur when parts of the computation window have already been computed for the past period of the same query or for other queries.

In order to reduce the foregoing two types of temporal redundancies, redundancy directed acyclic component 208 can for each node maintain an action point (e.g., an action point typically represents the time at which the next data fetch or computation is to be performed). The action point typically can be computed based on the time period and the tolerance: the largest time delay that can be utilized for the next action point without violating any of the query requirements.

In addition, each computation window can be broken down into smaller computation windows that can represent parts of the computation window that can be used again. For example, a computation window of 20 minutes can be broken down into 20 sub-windows of 1 minute duration, 10 sub-windows of 2 minutes, 5 sub-windows of 4 minutes, 4 sub-windows of 5 minutes, and/or 2 sub-windows of 10 minutes.

With the combination of these techniques, redundancy directed acyclic graph component 208 can significantly mitigate or obviate redundancy in data fetching (e.g., communication redundancy) and in computation. In addition, the foregoing techniques can be enhanced through use of artificial intelligence or machine learning to dynamically infer which computations are performed more often and where redundancies are likely to emerge. Further, redundancy directed acyclic component 208, prior to undertaking redundancy optimization, for example, can detect when redundancies are large enough to justify the cost of running the optimization procedure and updating the directed acyclic graph.

It will be noted in connection with FIG. 2 that in some instances coordinator 102 can need to be circumvented and for some query computation and data caching disparate other components can be employed to address specific resource bottlenecks. There can be a number of such multiple resource constraint scenarios, a few illustrations of which are presented below to outline the capabilities of the claimed subject matter.

One key resource bottleneck typically can be at sensors or data sources 106 where web bandwidth can be limited. This situation can arise when the sensors or data sources 106 are deployed at a user's home with a low bandwidth Internet connection as opposed to the high bandwidth enterprise Internet connection that can be available to coordinator 102 and/or applications 106. Such situations can also arise for remotely deployed sensors or data sources 106 using a low rate satellite link. The claimed subject matter can, for example, accommodate these situations in at least the following two ways. First, reuse as much persisted data as possible from cache 210 so that only minimal required data need be accessed over the bandwidth constrained link. Secondly, once redundancy directed acyclic graph component 208 has updated the directed acyclic graph employed by coordinator 102, part of the updated directed acyclic graph can be sent to the sensor or data sources 106 (or a gateway which serves multiple sensors or data source 106, for instance) whenever it is possible to perform some of the processing at data sources 106 itself Such a facility can reduce bandwidth usage as instead of raw data being forwarded to coordinator 102 for analysis and/or processing, processed, analyzed, and/or processed data can be sent over resource constrained links.

Another key resource bottleneck can occur with regard to applications 108 connectivity. In this instance only aggregated query results are typically being directed to applications 108. Aggregated query results typically consume lesser bandwidth than raw data, but if some aggregation step produces more data than the raw data itself, overall processing can become overburdened. Thus, processing can be distributed to applications 108 themselves. In this case, part of the directed acyclic graph formed at coordinator 102 can be replicated to applications 108 and the lowest rate data stream from a lower layer in the directed acyclic graph directed or sent to applications 108. In addition to the data rate, application connectivity can be limited in terms of availability (e.g., applications 108 can have only intermittent connectivity with coordinator 102). For example, a car Global Positioning System (GPS) using traffic sensor data sources (e.g., data sources 106) to compute traffic-aware driving directions may only have intermittent connectivity. In this case, coordinator 102 can store query results until the time applications 108 have restored connectivity and can download the results at that time.

Moreover, in certain cases applications 108 can need access to data as fast as possible. In this case coordinator 102 can help applications 108 in at least two ways. First, data router component 212 can select or choose the direct (or a less circuitous) path from data sources 106 to applications 108 and can continue to reduce computational or functional redundancies for other applications 108 by starting separate (or individual) streams from data sources 106 to coordinator 102. Second, coordinator 102 can send partial query results based at least in part on data persisted in cache 210 even before data from data sources 106 can be obtained. Both of these methods are possible due to the use coordinator 102 to process queries and cache data.

Further, in some instances the flow of data and queries can overwhelm coordinator 102 such as where the flow of data and queries can involve much more computation than can be performed by coordinator 102. In this situation, the subject matter as claimed can be modified to distribute the computed directed acyclic graph for redundancies to multiple processes, processors, or machines. Some of these processes, processors, or machines can be at data sources 106 or applications 108. The computed directed acyclic graph can be partitioned, apportioned, or broken up into parts such that portions with the most redundancy can be maintained at coordinator 102, and those with little or no redundancy sent to other processes, processors, or machines. Additionally, coordinator 102 can itself comprise or include multiple machines or processors sufficient to constitute a server farm.

Furthermore, there also may be instances where data flows from data sources 106 can contain large amounts of data that can cause network topology or cloud 104, the Internet backbone, or other communication networks to become overloaded. In this case coordinator 102 can transfer the lower layers of a constructed directed acyclic graph to data sources 106 so that some of the processing can occur at data sources 106 and the communication network need only carry aggregated data which typically can require lower bandwidth.

Further, to minimize communication redundancy, cache 210 associated with redundancy directed acyclic graph component 208 can store data values obtained from sources at leaf nodes. The computed values at other nodes can also be cached. Such caching allows multiple queries to be answered from just a single data fetch. Also, if in the future queries need past data that is present in the cache, communication to and with data sources 106 can be avoided. Cache 210 nevertheless may only have a finite amount of storage resources available and hence it can employ a cache expiration policy to delete old data from cache 210 to make space for new incoming data. The caching policy can be designed to suit system needs. For instance, if it is known that queries are unlikely to request data older than one month, then data older than one month can be deleted or persisted on secondary or tertiary long term cache. Also, the caching policy may be different for different nodes of the directed acyclic graph. For example, if it is known that data from leaf nodes is generally less likely to be requested after 30 days but average data over a large region can be requested even after a year, then leaf nodes and other nodes can have different and distinct expiration policies. Moreover, cache expiration policies can be based on attributes other than the timestamp of the data. For instance, when a data value is found to be anomalous or have other interesting characteristics, it can be cached for a longer period. Additionally, adaptive techniques to estimate the usefulness of different data at different nodes of the directed acyclic graph can be employed. It should be noted that the memory used for the directed acyclic graph nodes and the data cache need not be contiguous or even on the same device—for instance, in accordance with one aspect directed acyclic graph nodes can be kept in fast random access memory while the cache may be stored on a slower but non-volatile secondary storage device such as a hard disk or flash memory.

With regard to cache 210 as depicted in FIG. 2; cache 210 can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate networks, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information obtained from the disparate network, ratings from a website, a credit score, geographical location, a donation to charity, or any other information related to software, applications, web conferencing, and/or any suitable data related to transactions, etc.

It is to be appreciated that cache 210 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). Cache 210 of the subject systems and methods is intended to comprise, without being limited to, these and any other suitable types of memory. In addition, it is to be appreciated that cache 210 can be a server, a database, a hard drive, and the like.

FIG. 2 also provides further illustration of data sources 106, as illustrated data sources 106 can include many disparate and/or similar devices, components, and/or processes. For instance, and as depicted, data sources 106 can include data source$_1$ 106$_1$, . . . data source$_N$ 106$_N$, where N is an integer, whole number, or natural number greater than or equal to 1, that can be one or more of cameras, temperature gauges, computer chips, timing devices, portable devices (e.g., laptops, cell phones, smart phones, etc.), devices and/or components associated with vehicles (e.g., trucks, automobiles, railway rolling stock, locomotive engines, etc.), machinery and/or devices associated with aviation (e.g., Transponder Landing Systems, Beam Approach Beacon Systems, Local Area Augmentation Systems, Wide Area Augmentation Systems, Global Positioning Systems, VHF Omni-directional Radio Range finders, Radars, and the like).

FIG. 2 also provides depiction of applications 108 that can include many disparate and/or similar processes, components and/or devices requesting information to be streamed from data sources 106 for further analysis, inspection, and/or processing. For example, and as illustrated, applications 108 can include application$_1$ 108$_1$ . . . applications 108$_T$, where T is an integer, whole number, or natural number greater than or equal to 1 that can compute the fastest driving directions based on traffic conditions and/or obtained road condition data from data sources 106 and can thereafter determine route travel times resulting in selection of one or more minimum time route.

Figure 8:
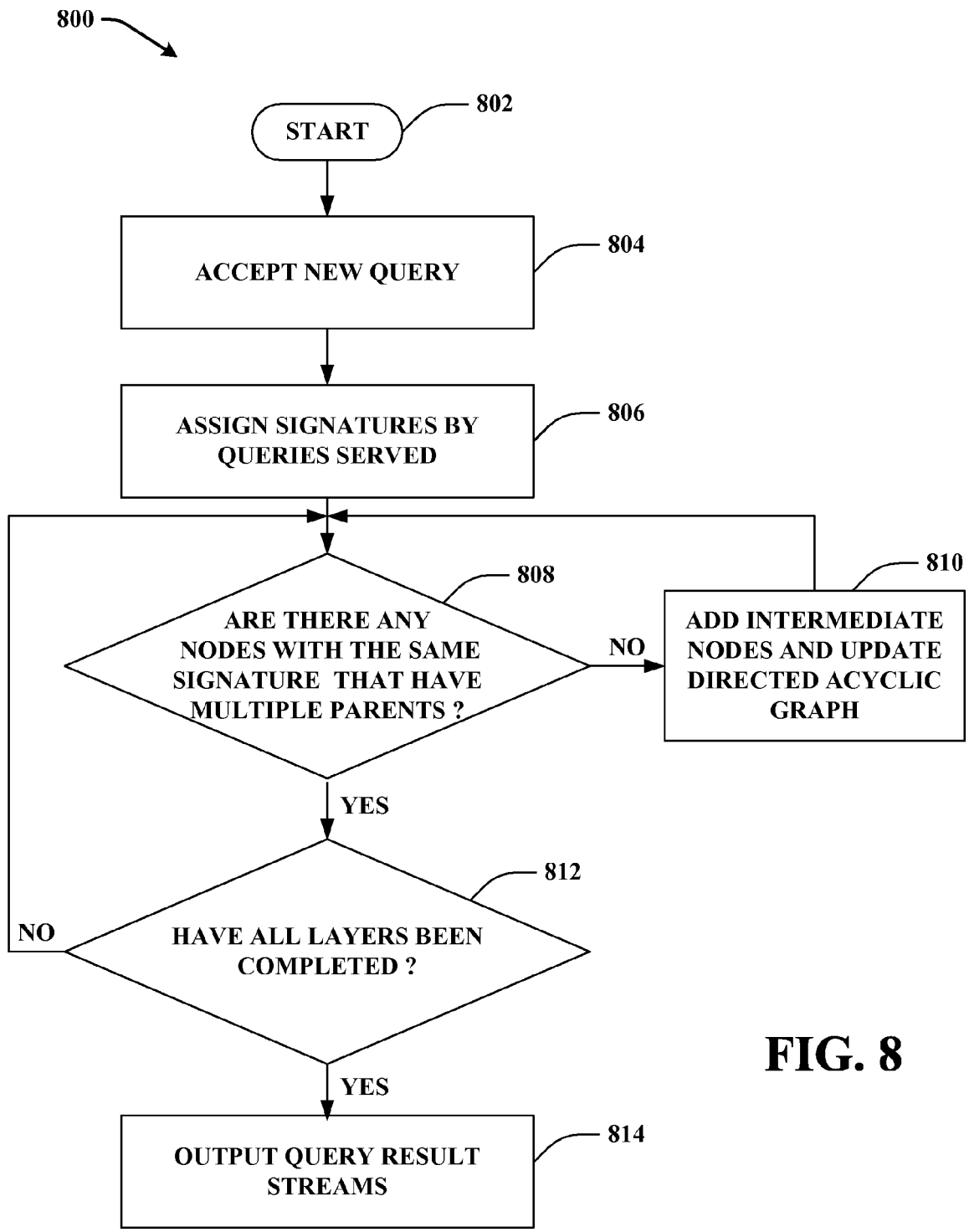
FIG. 8 illustrates a flow diagram of a machine implemented methodology that effectuates and facilitates efficient stream sharing for multi-sensor data collection in accordance with an aspect of the claimed subject matter.

In view of the illustrative systems shown and described supra, methodologies that may be implemented in accordance with the disclosed subject matter will be better appreciated with reference to the flow chart of FIG. 8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 8 illustrates a machine implemented methodology 800 that effectuates and/or facilitates efficient stream sharing for multi-sensor data collection. At 802 the method can commence at which point various and sundry initialization tasks can be initiated and performed. At 804 a new query can be received and/or acquired. At 806 signature assignment or allocation can take place. Signature assignment or allocation can involve determining or computing a number representative of all queries that it serves. The number or signature typically can be a unique number representing each unique combination of queries served. Thus, at 808 a determination is made as to whether there are any nodes with the same signature that have multiple parents. Where it is determined at 808 that there are no nodes with the same signature that have multiple parents (e.g., NO) methodology 800 can proceed to 810 where intermediate nodes can be added and the directed acyclic graph can be updated or if not extant at this juncture, generated or created. Once intermediate nodes have been added and the directed acyclic graph updated the method can cycle to 808. If on the other hand it is determined at 808 that there are nodes with the same signature and these nodes have multiple parents (e.g., YES) the methodology can proceed to 812. At 812 another determination can be made wherein it is ascertained whether all layers have been completed. Here, at each layer, for each set of nodes with the same signature that are connected to more than one node, a new upper layer node can be created. This new upper layer node (or intermediate node) can capture the commonality of computation associated with nodes with the same signature and multiple parents. Where it is ascertained at 812 that all layers have been completed (e.g., YES) the method can proceed to 814 at which point query result streams can be set to flow from all upper layer nodes that perform computations of final query results, otherwise (e.g., NO) the method can cycle back to 808.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 9:
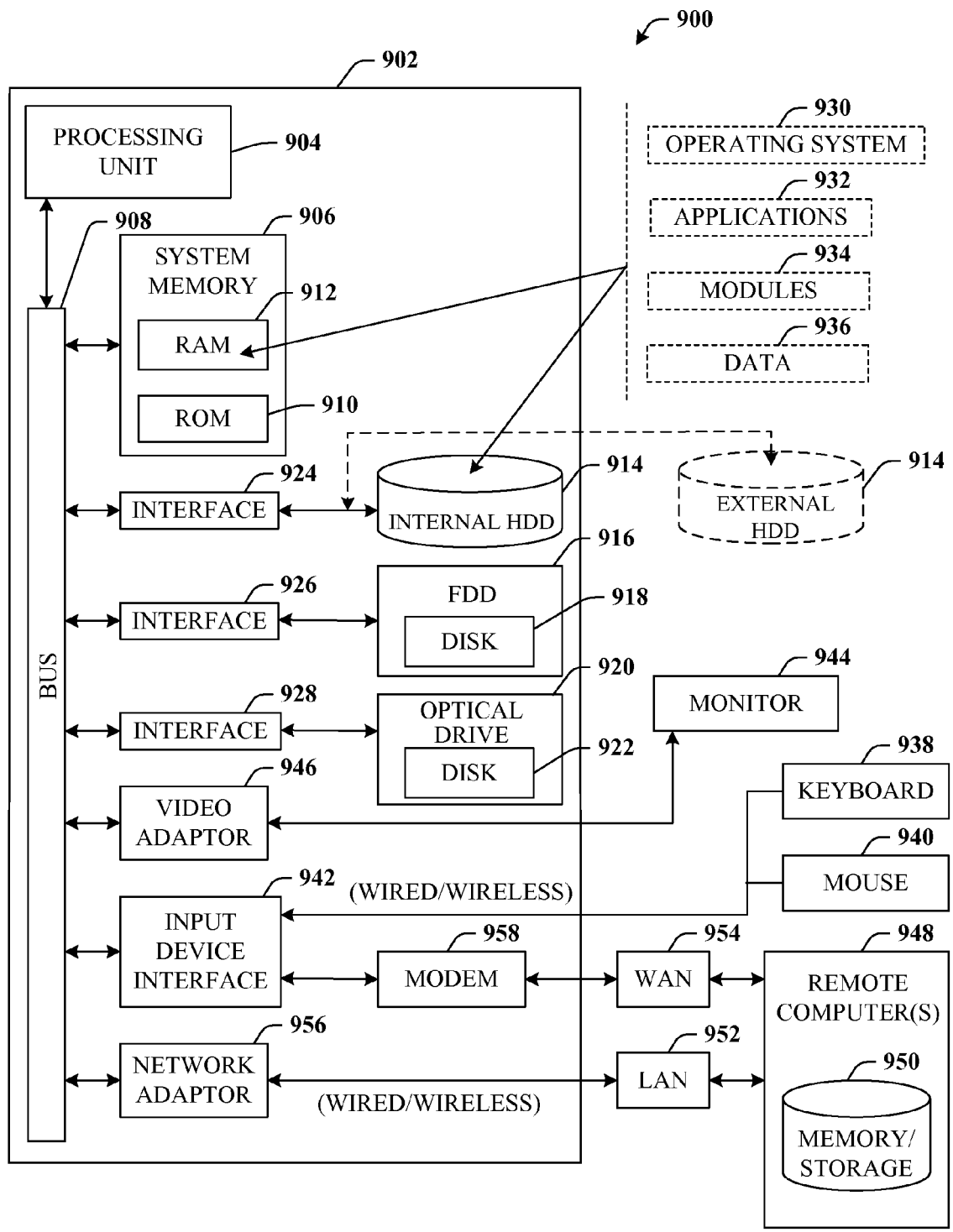
FIG. 9 illustrates a block diagram of a computer operable to execute the disclosed system in accordance with an aspect of the claimed subject matter.

Referring now to FIG. 9, there is illustrated a block diagram of a computer operable to execute the disclosed system. In order to provide additional context for various aspects thereof, FIG. 9 and the following discussion are intended to provide a brief, general description of a suitable computing environment 900 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the illustrative environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 994 interface technologies. Other external drive connection technologies are within contemplation of the claimed subject matter.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed and claimed subject matter.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the claimed subject matter can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 994 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are illustrative and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10 BaseT wired Ethernet networks used in many offices.

Figure 10:
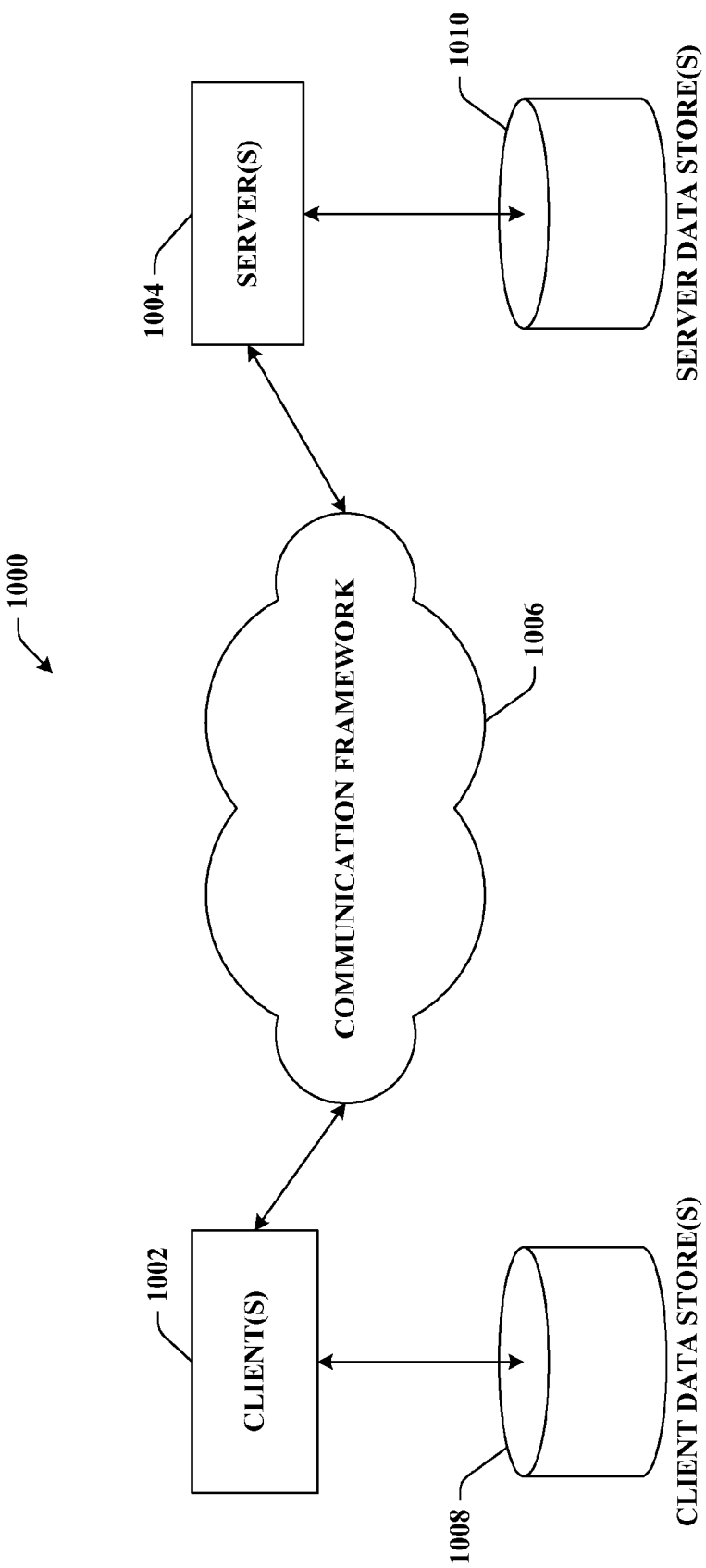
FIG. 10 illustrates a schematic block diagram of an illustrative computing environment for processing the disclosed architecture in accordance with another aspect.

Referring now to FIG. 10, there is illustrated a schematic block diagram of an illustrative computing environment 1000 for processing the disclosed architecture in accordance with another aspect. The system 1000 includes one or more client(s) 1002. The client(s) 1002 can be hardware and/or software (e.g., threads, processes, computing devices). The client(s) 1002 can house cookie(s) and/or associated contextual information by employing the claimed subject matter, for example.

The system 1000 also includes one or more server(s) 1004. The server(s) 1004 can also be hardware and/or software (e.g., threads, processes, computing devices). The servers 1004 can house threads to perform transformations by employing the claimed subject matter, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates and effectuates efficient stream sharing for multi-user sensor data collection, the system comprising:
 a component that acquires a query via an interface,
  the component locates within the query a specification that includes a region over which data is requested,
  based at least in part on the region over which the data is requested the component determines one or more sensors situated within the region,
  the component ascertains which of the one or more sensors is currently streaming the data or has persisted the data and which of the one or more sensors need to be initialized to fulfill the query,
  the component at least one of constructs or utilizes a directed acyclic graph to obviate redundancy in a functional requirement imposed by the query and formulate a result directed to an application,
  the component obviates redundancy in the functional requirement by assigning a signature to leaf or non-leaf nodes associated with the directed acyclic graph, utilizing the signature to identify common leaf nodes, common non-leaf nodes, or common operations between the query and a second query, inserting an intermediate node in the directed acyclic graph, directing an edge from the common leaf node, the common non-leaf nodes, or the common operations to the intermediate node, and carrying out the assigning, the utilizing, the inserting, or the directing one or more times to capture re-usable computations; and
 a processing unit that executes the component,
 wherein the component forwards the data, flowing from the one or more sensors, directly to the application based at least in part on a determination that the functional requirement imposed by the query or a temporal characteristic included in the query is unique to the application or is unique with respect to another query.

2. The system of claim 1, the region demarcates an area circumscribed by at least one of a geographic boundary, a political boundary, a strip covering a road route, or an area defined by a polygon.

3. The system of claim 1, the query includes a temporal characteristic required of the data.

4. The system of claim 1, the component determines an accuracy level associated with the query, based at least in part on the accuracy level, the component at least one of prunes or augments a list of sensors to correspond with the accuracy level.

5. The system of claim 1, the component ascertains an accuracy level associated with the query based at least in part on cost-based guidelines of sensor data budgets.

6. The system of claim 1, the component constructs a rationalized list of sensors utilized to satisfy the query, the rationalized list of sensors include the one or more sensors within the region specified in the query, or a sensor pruned from or added to the rationalized list based at least in part on at least one of a sensor characteristic, a cost-based guideline, or a sensor data budget.

7. The system of claim 1, the component directs a branch from the directed acyclic graph to the one or more sensors for pre-processing, the one or more sensors return partially processed data that satisfy the functional requirement imposed by the query.

8. The system of claim 1, the component directs the data from the one or more sensors to a data cache based at least in part on a determination that the data has a past, present, or future utility to fulfill the functional requirement imposed by the query.

9. The system of claim 1, the component directs the data from the one or more sensors to the application based at least in part on bandwidth usage cost or a latency cost.

10. A method performed by a computing device, the method sharing at least one of data access, computation, or functional workload among multiple applications, the method comprising:
 locating a specification that includes an area over which data is requested;
 based at least in part on the area over which the data is requested, determining a data source location situated within the area;
 determining a data source that is currently streaming data or has persisted data or initiating another data source that is needed to fulfill a query;
 based at least in part on the determining or the initiating, constructing or employing a directed acyclic graph to obviate redundancy in a functional requirement imposed by the query and formulating a result directed to an application; and
 diverting data flowing from the data source or the another data source directly to the application, the diverting being based on a determination that the functional requirement imposed by the query is unique to the query.

11. The method of claim 10, further comprising ascertaining accuracy levels associated with the query and based on the ascertaining removing or adding other data sources located in the area over which data is requested to comport with the accuracy levels.

12. The method of claim 10, further comprising determining accuracy levels associated with the query based at least in part on at least one of cost-based guidelines or sensor data budgets.

13. The method of claim 10, further comprising isolating a branch associated with the directed acyclic graph and sending the branch to the application for post-processing.

14. The method of claim 10, the constructing or employing of the directed acyclic graph further comprising:
 assigning a signature value to each leaf node or non-leaf node associated with the directed acyclic graph;
 identifying common leaf nodes, common non-leaf nodes, or common operations between the query and a second query; and
 modifying the directed acyclic graph to include an intermediate node with arcs emanating from the common leaf nodes, the common non-leaf nodes, or the common operations re-directed to the intermediate node, and repeating the modifying one or more times for capturing re-usable computations.

15. The method of claim 10, further comprising persisting the data flowing from the data source or the another data source based on a past, present, or future need ascertained from the functional requirement imposed by the query.

16. A system comprising:
 a coordinator configured to:
  receive a first query requesting that a particular operation is applied to first data values from first data sources,
  receive a second query requesting that the particular operation is applied to second data values from second data sources,
  represent the first query using a first graph having:
   first leaf nodes representing the first data values from the first data sources, the first leaf nodes having an associated first signature representing that the first leaf nodes serve the first query, and first non-leaf nodes representing first computed values obtained by applying the particular operation to the first data values, represent the second query using a second graph having:

second leaf nodes representing the second data values from the second data sources, the second leaf nodes having an associated second signature representing that the second leaf nodes serve the second query, and second non-leaf nodes representing second computed values obtained by applying the particular operation to the second data values, identify a subset of common data values from the first data values and the second data values by detecting common leaf nodes from the first leaf nodes and the second leaf nodes, wherein some individual first data values represented by remaining first leaf nodes are not part of the subset and some individual second data values represented by remaining second leaf nodes are not part of the subset, assign the common leaf nodes a new third signature while retaining the first signature for the remaining first leaf nodes and retaining the second signature for the remaining second leaf nodes, and combine the first graph and the second graph to create a combined graph, wherein, in the combined graph, the remaining first leaf nodes have the first signature, the remaining second leaf nodes have the second signature, and the common leaf nodes have the new third signature; and a computing device configured to execute the coordinator.

17. The system of claim 16, wherein the combined graph includes:

a first intermediate node representing application of the particular operation to each of the first data values represented by first nodes, and a second intermediate node representing application of the particular operation to each of the second data values represented by the second leaf nodes.

18. The system of claim 17, wherein the coordinator is configured to:

perform an optimization of the combined graph, the optimization comprising creating a third intermediate node representing application of the particular operation to the subset of common data values represented by the common leaf nodes.

19. The system of claim 18, wherein the optimization further comprises:

adjusting the combined graph such that the first intermediate node represents application of the particular operation to only the some individual first data values represented by the remaining first leaf nodes and not the subset of common data values represented by the common leaf nodes; and adjusting the combined graph such that the second intermediate node represents application of the particular operation to only the some individual second data values represented by the remaining second leaf nodes and not the subset of common data values represented by the common leaf nodes.

20. The system of claim 19, wherein the particular operation is a summation operation and, after the optimization:

the first intermediate node represents application of the summation operation to the individual first data values that are not part of the subset of common data values;

the second intermediate node represents application of the summation operation to the individual second data values that are not part of the subset of common data values; and the third intermediate node represents application of the summation operation to the subset of common data values part of the subset of common data values.

21. The system of claim 20, wherein the first query and the second query also request an average operation and, after the optimization, the combined graph includes:

a fourth intermediate node representing application of an average operation to a first sum of:
the common data values, and
the individual first data values that are not part of the subset of common data values, and a fifth intermediate node representing application of the average operation to a second sum of:
the subset of common data values, and
the individual second data values that are not part of the subset of common data values, wherein the fourth intermediate node is directly connected to the first intermediate node, is not directly connected to the second intermediate node, and is not directly connected to the third intermediate node, and wherein the fifth intermediate node is directly connected to the third intermediate node, is not directly connected to the first intermediate node, and is not directly connected to the second intermediate node.

22. A method performed by a computing device, the method comprising:

receiving a first query requesting that a particular operation is applied to first data values from first data sources, receiving a second query requesting that the particular operation is applied to second data values from second data sources, representing the first query using a first graph having:
first leaf nodes representing the first data values from the first data sources, the first leaf nodes having an associated first signature representing that the first leaf nodes serve the first query, and
first non-leaf nodes representing first computed values obtained by applying the particular operation to the first data values, representing the second query using a second graph having:
second leaf nodes representing the second data values from the second data sources, the second leaf nodes having an associated second signature representing that the second leaf nodes serve the second query, and
second non-leaf nodes representing second computed values obtained by applying the particular operation to the second data values, identifying a subset of common data values from the first data values and the second data values by detecting common leaf nodes from the first leaf nodes and the second leaf nodes, wherein some individual first data values represented by remaining first leaf nodes are not part of the subset and some individual second data values represented by remaining second leaf nodes are not part of the subset, assigning the common leaf nodes a third signature while retaining the first signature for the remaining first leaf nodes and retaining the second signature for the remaining second leaf nodes, and combining the first graph and the second graph to create a combined graph, wherein, in the combined graph, the remaining first leaf nodes have the first signature, the remaining second leaf nodes have the second signature, and the common leaf nodes have the third signature.

* * * * *